May 7, 1968 W. C. AHRNS 3,382,347
TABULATING CARD READER
Filed Jan. 3, 1963 10 Sheets-Sheet 1

FIG. 1.

INVENTOR
WILBUR C. AHRNS
BY John A. Harvey
ATTORNEY

May 7, 1968 W. C. AHRNS 3,382,347
TABULATING CARD READER
Filed Jan. 3, 1963 10 Sheets-Sheet 5

United States Patent Office 3,382,347
Patented May 7, 1968

3,382,347
TABULATING CARD READER
Wilbur C. Ahrns, Rochester, N.Y., assignor by mesne assignments, to Friden, Inc., San Leandro, Calif., a corporation of Delaware
Filed Jan. 3, 1963, Ser. No. 249,202
13 Claims. (Cl. 235—61.11)

The present invention relates to tabulating card readers and, particularly to such readers which read a tabulating card from end to end to derive the punch-code recorded information of the card by successively recorded information items.

Tabulating cards are widely used to record alphanumeric characters, symbols, and machine-function-control items of information by use of conventional punch codes. The recording area of the card is considered as made up of columns and rows of index points, the rows being arranged parallel to a longitudinal median line of the card and having pre-assigned code values while the columns are arranged from end to end of the card perpendicular to a longitudinal median line and record successive items of information. An "index point" conventionally refers to each of plural assigned positions of the card area at which a code aperture may be punched in recording coded information. One form of tabulating card is conventionally read by continuous movement of the card lengthwise or edgewise through a reading zone of the reader, the reading zone includes reading brushes which concurrently read the code apertures appearing either in successive columns of index points or in successive rows thereof. In using another form of card, the tabulating card travels by lengthwise or edgewise movement into stationary reading position where an array of mechanical sensing pins, corresponding in position to the array of index points of the card, may sense concurrently all code apertures punched in the card.

There are certain applications where it is desirable that a punched card move lengthwise through the card reader to read and immediately use successive items of recorded information, and in these instances the card movement may be essentially continuous or step-by-step by successive index point columns. It is then conventional to sense the code apertures by mechanical aperture sensing devices in preference to electrical reading brushes. One form of mechanical aperture sensing device is comprised by a star wheel rotationally supported at the end of a pivoted lever and arranged in alignment with an individual index-point row of the card. Adjacent pairs of teeth of the star wheel non-rotationally engage the card's surface to keep the end of the pivoted lever spaced from the card until a tooth of the wheel enters a code aperture, whereupon the end of the lever moves by spring bias closer to the card's surface with resultant angular rotation of the lever. This angular rotation of the lever is used to control one or more pairs of electrical contacts between their contact-open and contact-closed positions. Where the card is to be moved step-by-step through the reader with controlled halt of motion after reading any one information item, the precise initial placement of the card in the reader for reading of the first possible information item and the subsequent step-by-step controlled motion of the card become of critical importance if significant operational reading error is to be avoided. This is particularly true where the cards are manually loaded one after another into reading position, since operator carelessness or lack of skill may easily result in improper initial card positioning and thus in erroneous and inconsistent card reading operation.

It is an object of the present invention to provide a new and improved tabulating card reader which is adapted to read manually inserted cards, but nevertheless is relatively immune from erroneous and inconsistent reading operations even when operated by a person having little or no training or skill.

It is a further object of the invention to provide a novel tabulating card reader adapted accurately and consistently to read each of successive items of information recorded in a card, and one which having been conditioned to initiate a card reading operation must complete the operation before a card in reading position can be removed so that reading error cannot be created by an unskilled operator altering the reading position of the card or prematurely removing it from the reader.

It is an additional object of the invention to provide a tabulating card reader of improved construction in which the card is positively driven longitudinally past code aperture sensing devices by accurately controlled step motion and positioning precisely related to the index-point column spacings of the card and notwithstanding that such step motion is repetitive at high rate or that the card is rapidly accelerated and halted in motion during each step feed.

Other objects and advantages of the invention will appear as the detailed description thereof proceeds in the light of drawings forming a part of this application, and in which.

Referring now more particularly to FIGS. 1–6 of the drawings, there is illustrated a tabulating card reader embodying the present invention in a particular form. The reader is conveniently fabricated as a lower subassembly 10 and an upper subassembly 11. The lower subassembly 10 includes side plates 12 and 13 assembled in spaced relation by use of spacing bars 14, 15 and 16, the side plates having turned over flanges 17 to which the upper subassembly 11 is secured as shown by turned over flanges 18 of side plates 19 and 20 assembled in spaced relation by a spacing bar 21.

The tabulating card reader includes a power driven shaft 23 (FIG. 5) journalled at one end by a bearing structure 24 in the side plate 13 and journalled at its opposite end by a 90° helical spring wire clutch 25 which itself is journalled by a bearing 26 in the side plate 12. The clutch 25 is of conventional construction such as illustrated in U.S. Patent No. 2,927,158, except that four detent protuberances 27a and keeper notches 27b are provided on the respective clutch housing 27c and keeper member 27d and four knock-off lobes are provided on the clutch cam 28 rather than the pairs of these elements illustrated for the 180° clutch construction of the patent last mentioned. The clutch 25, according to the energization or deenergization of its control electromagnet, is thus operative at 90° rotational angles of the shaft 23 mechanically to connect the shaft to or disconnect it from a pulley 29 drivingly connected by a belt to a reader driving motor (not shown).

The reader includes a tabulating card main drive roll 30 fabricated with spaced card-engaging driving discs 31 and rotationally journalled on a shaft 32 supported by side plates 12 and 13. This main drive roll 30 is provided with a gear 33 which is driven from the shaft 23 by means of a speed reduction gear train. The latter includes a pinion gear 34 on the shaft 23 and having meshed engagement with an idler gear 35 integrally formed on a bushing 36 with a spaced pinion idler gear 37 in meshed engagement with the gear 33. The bushing 36 is rotationally supported on a stud 38 having a flange 39 secured by machine screws to the side plate 13. The ratio of the gears 34 and 35 and that of the gears 33 and 37 is selected in relation to the circumference of the main drive roll discs 31 such that each 90° angular rotation of the driving shaft 23 moves a tabulating card, in engagement with the peripheral surfaces of the discs 31, by a distance corresponding to the spacing between index-point columns of the card.

Figure 6:
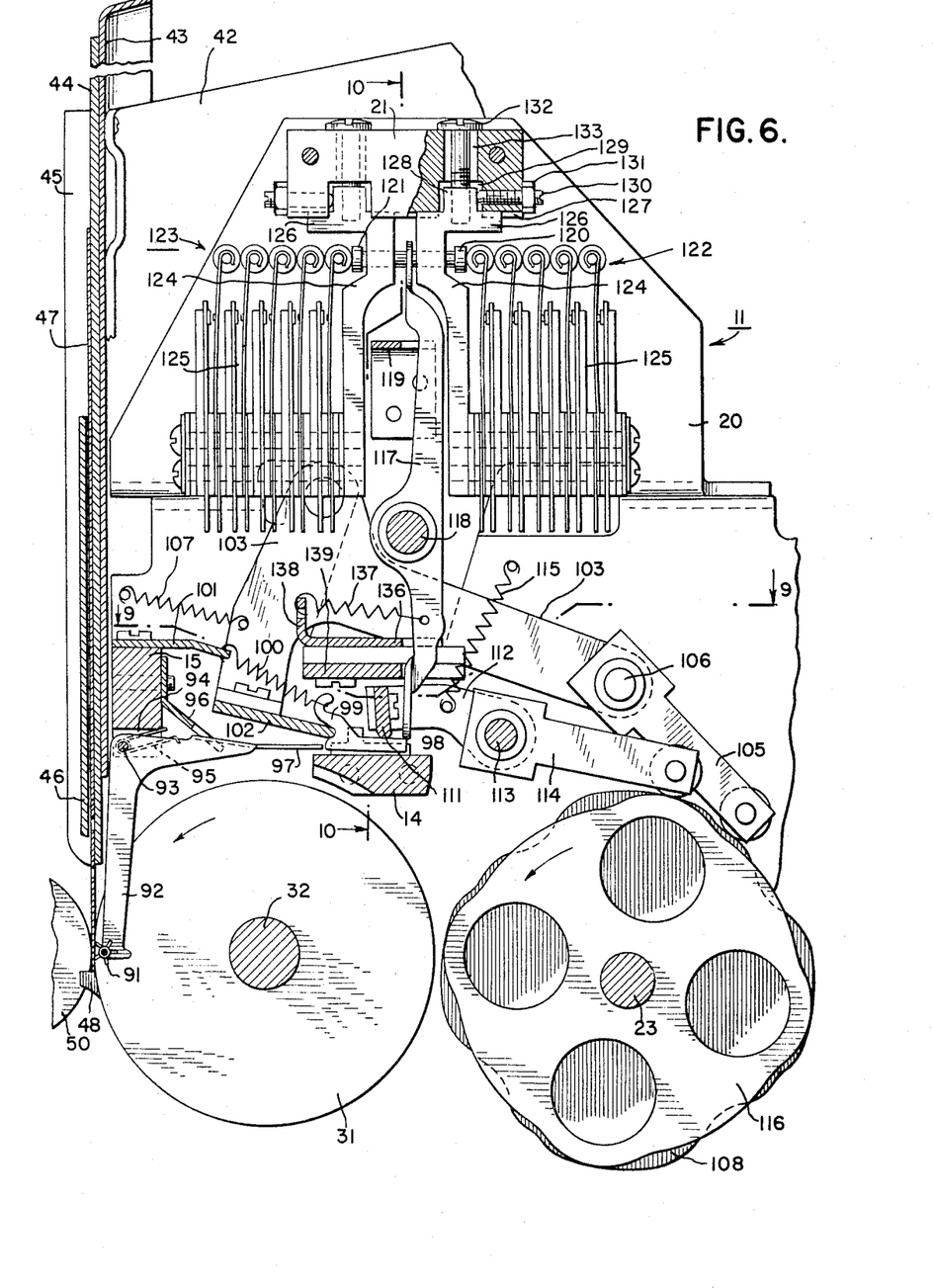
FIG. 6 is an elevational cross-sectional view of the upper portion of the reader to illustrate the construction, arrangement, and character of operation of the tabulating card reading components in relation to initiation of each card reading operation of the reader.

The tabulating card reader is enclosed within a housing, indicated in FIG. 6 as having a side wall 42 and a front panel 43, and there is provided on the front panel 43 a tabulating card guide structure. The latter is comprised by a plate 44 having laterally spaced and upstanding card guide flanges 45, and an intervening guide plate 46 supported in spaced relation to the plate 44 and adapted to cooperate with the latter and the flanges 45 to provide a guide aperture by which a tabulating card 47 is guided lengthwise into reading position in the reader. In the home position of the reader, at which the reading of each tabulating card begins, spaced ones of the main drive roll discs 31 are provided with projecting stop portions 48 which engage the end of the tabulating card 47 upon manual insertion of the card into reading position in the reader.

The reader is also provided with a card feed pressure roll 49 fabricated with spaced discs 50 arranged in opposing relation to those discs 31 of the main drive roll 30 which are devoid of the card stop portions 48. The pressure roll 49 is rotatably supported upon a shaft 51 extending between side arms 52 and 53 secured to a shaft 54 rotationally supported between the side plates 12 and 13. The pressure roll 49 is provided at one end with a gear 55 in meshed engagement with a gear 56 provided on the main drive roll 30. This meshable relationship of the gears 55 and 56 is maintained even during intervals when the main drive roll 30 and pressure roll 50 are moved to spaced relation near the end of each card reading operation. This spacing of the rolls is accomplished by segmental gears 57 and 58 (FIG. 5) provided as shown in axially aligned positions on the respective gears 33 and 56, and engageable with similarly aligned one-tooth gear segments 59 provided on each extremity of the pressure roll 49. Upon separation of the main feed roll 30 and pressure roll 49, by rotational engagement of the segmental gears 57 and 58 with their associated one-tooth gear segments 59 as occurs once for each complete revolution of the main drive rolls 30, both of the pressure roll supporting arms 52 and 53 are moved into latched engagement with individual ones of a pair of latch arms 60 (FIGS. 2 and 3) which are secured on a sleeve 69 rotatably supported on a shaft 61 extending between the side plates 12 and 13. The latch arms 60 are biased into latching position by a helical wire spring 62. The remote ends of the latch arms 60 are connected by a strap 63 to which is secured an armature 64 positioned opposite the pole pieces of electromagnets 65 supported upon a bracket 66 extending between the side plates 12 and 13. The initial conditioning of the reader for each new card reading operation is accomplished by brief electric energization of the electromagnets 65, which attract the armature 64 and rotate the latch arms 60 out of engagement with latch notches 67 provided on the remote ends of the idler roll supporting arms 52 and 53. The latter are biased by helical wire springs 68 for rotation on the shaft 54 to engage the pressure roll 49 against a tabulating card inserted into reading position in the reader and thus press the tabulating card against the discs 31 of the main feed roll 30. The gears 55 and 56 effect positive drive of the pressure roll 49 from the main drive roll 30 so that both rolls are effective in drivingly transporting the card through the reader. This double-roll drive of the card avoids any possibility of slippage between the card and main drive roll 30 so that successive index-point columns of the card are always accurately positioned for reading. Subsequent successive brief energizations of the electromagnet (not shown) of the clutch 25 effect step-by-step transport of the tabulating card by drive of the main drive roll from the power driven shaft 23 in the manner earlier explained, each such step transport of the card corresponding to the space between successive index-point columns of the card.

Figure 1:
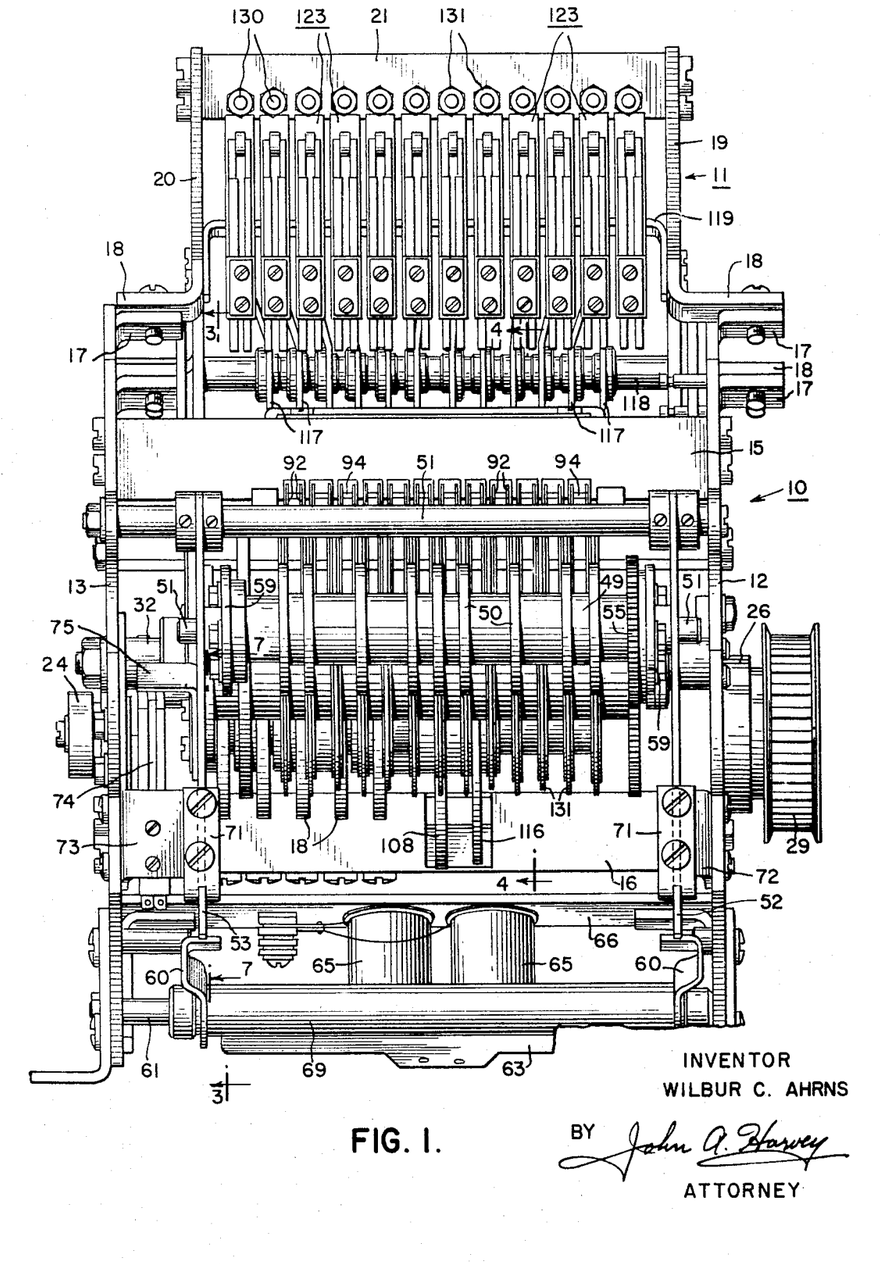
FIGS. 1 and 2 illustrate respective rear and side elevational views of a tabulating card reader embodying the present invention.
Figure 2:
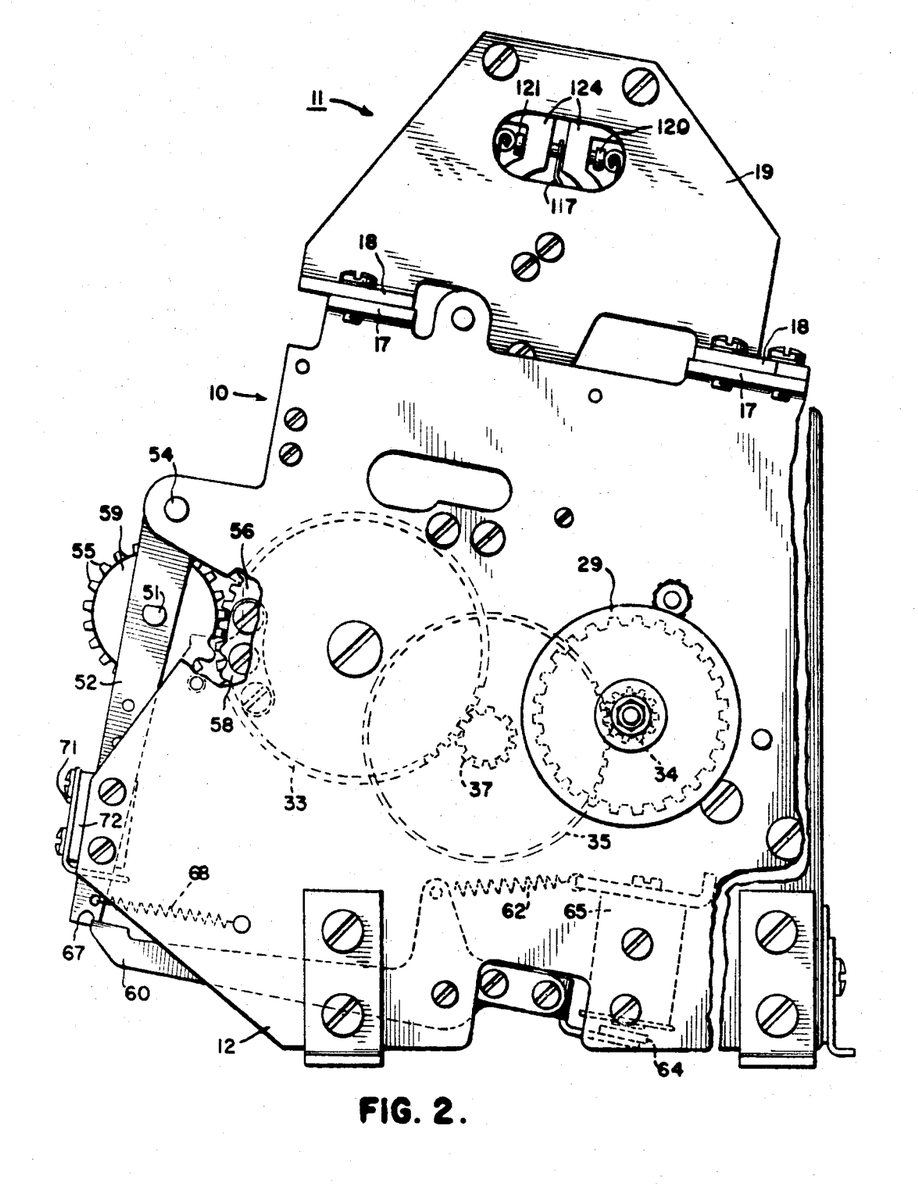
Figure 5:
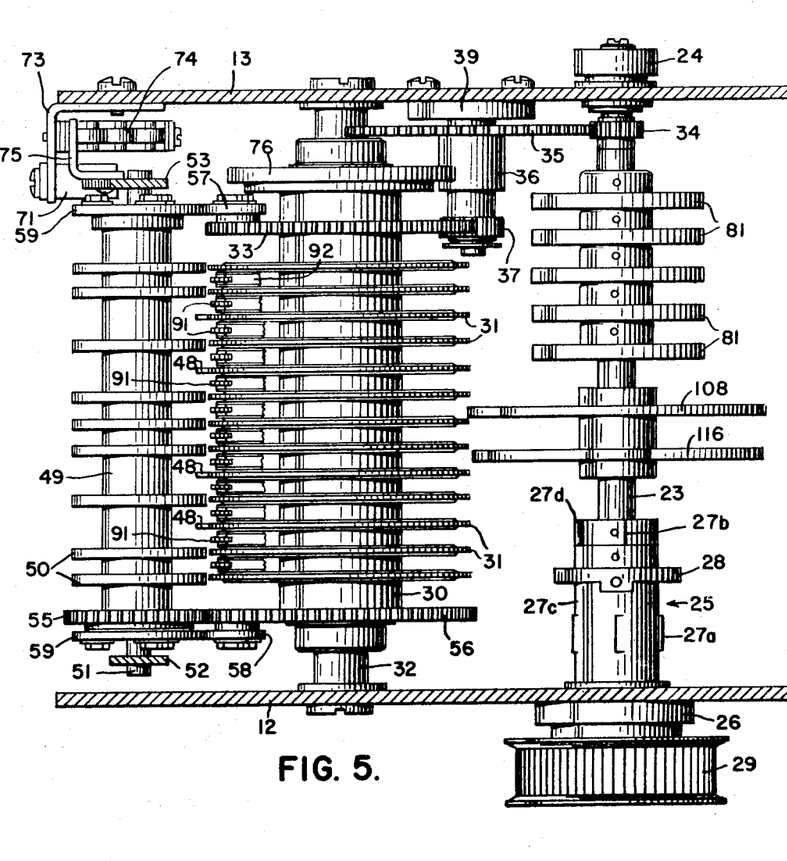
FIG. 5 is a cross-sectional plan view further illustrating the card transport structure of the reader.
Figure 7:
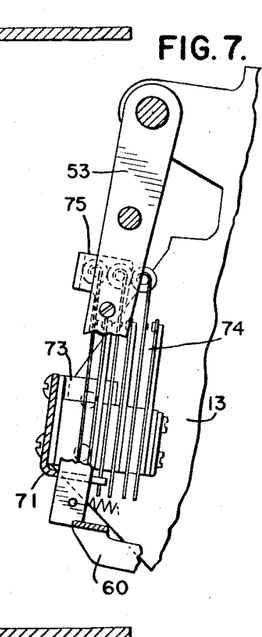
FIG. 7 is a fragmentary cross-sectional view illustrating the arrangement and actuation of certain control electrical contacts employed in the reader structure.

The pressure roll supporting arms 52 and 53 are guided in their rotational movement on the shaft 54 by one-tooth comb brackets 71 mounted by machine screws on individual L-shaped brackets 72 and 73 secured by machine screws to the respective side walls 12 and 13. The bracket 72 also supports an electrical contact assembly 74 (FIGS. 1 and 7) having movable contacts which are actuated by an L-shaped bracket 75 secured by machine screws to the arms 53 as shown in FIGS. 1 and 5. In particular, the contacts of the contact assembly 74 are in open-contact position when the pressure roll 49 is latched in spaced relation to the feed roll 30 and are actuated to closed-contact position when the pressure roll is unlatched and moves to card engaging position. These electrical contacts are used in providing an indication in the electrical control system of the reader whether or not the pressure roll 49 is in its card engaging position.

Figure 3:
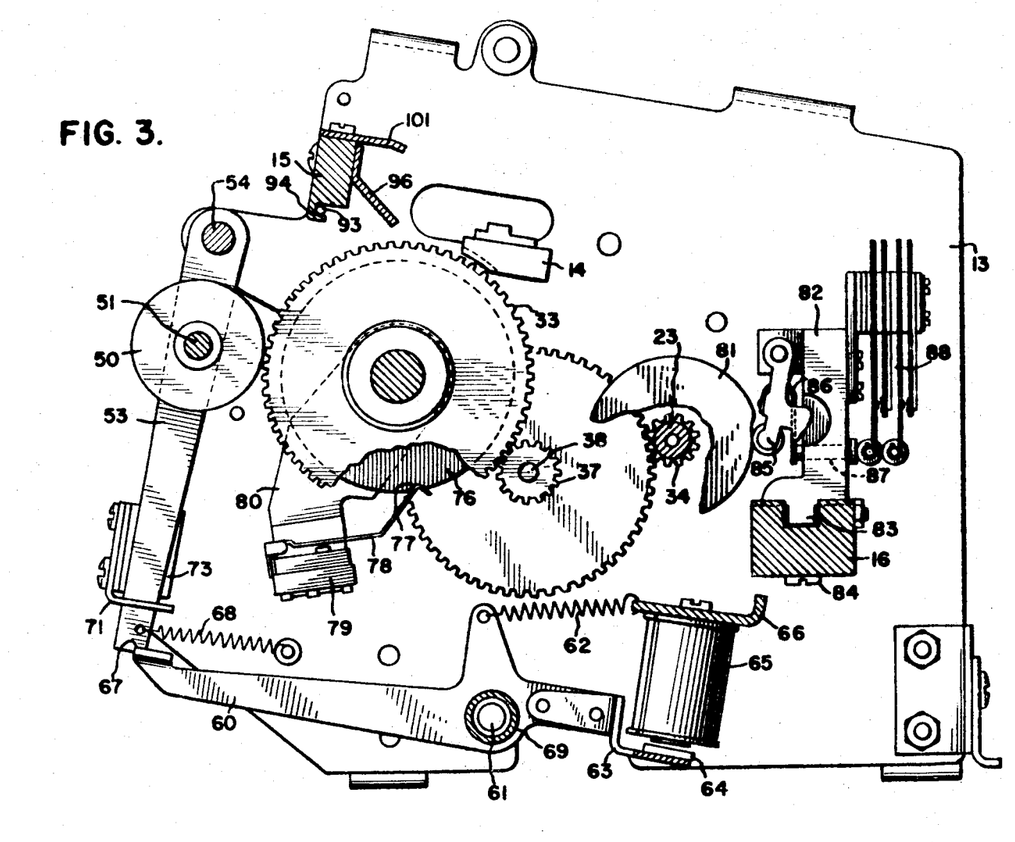
FIGS. 3 and 4 are elevational cross-sectional views illustrating the arrangement of components used in effecting movement of a tabulating card through the reader and in reading successive index-point columns of the card.

As shown more clearly in FIGS. 3 and 5, the main feed roll 30 is provided at one end with a cam disc 76 having on its periphery a single notch 77 engageable by a pivoted feeler lever 78 which operates a microswitch 79 mounted on an L-shaped bracket 80 secured to the side wall 13. The notch 77 of the disc 76 is located at the earlier mentioned "home" position of the main feed roll 30. This is the position at which each tabulating card reading operation of the reader terminates and a new reading operation subsequently begins, and the operation of the microswitch 79 by the feeler lever 77 thus provides an indication in the electrical control system of the reader whether or not the reader is at its "home" position.

The power driven shaft 23 of the reader is provided with a plurality of spaced cams 81 which are fixedly secured to rotate with the shaft. These cams operate individual contact subassemblies 82 which are non-rotatably positioned by a longitudinal slot 83 formed as shown in the upper face of the spacing bar 16 and are secured to the latter by machine screws 84. The subassemblies 82 include a cam-follower arm 85 biased into contact with the associated cam 81 by a leaf spring 86 which also through a plunger 87 actuates the movable contacts of an electrical contact assembly 88. These electrical contacts are used in a more complete electrical control system in which the tabulating card reader forms one component.

Figure 4:
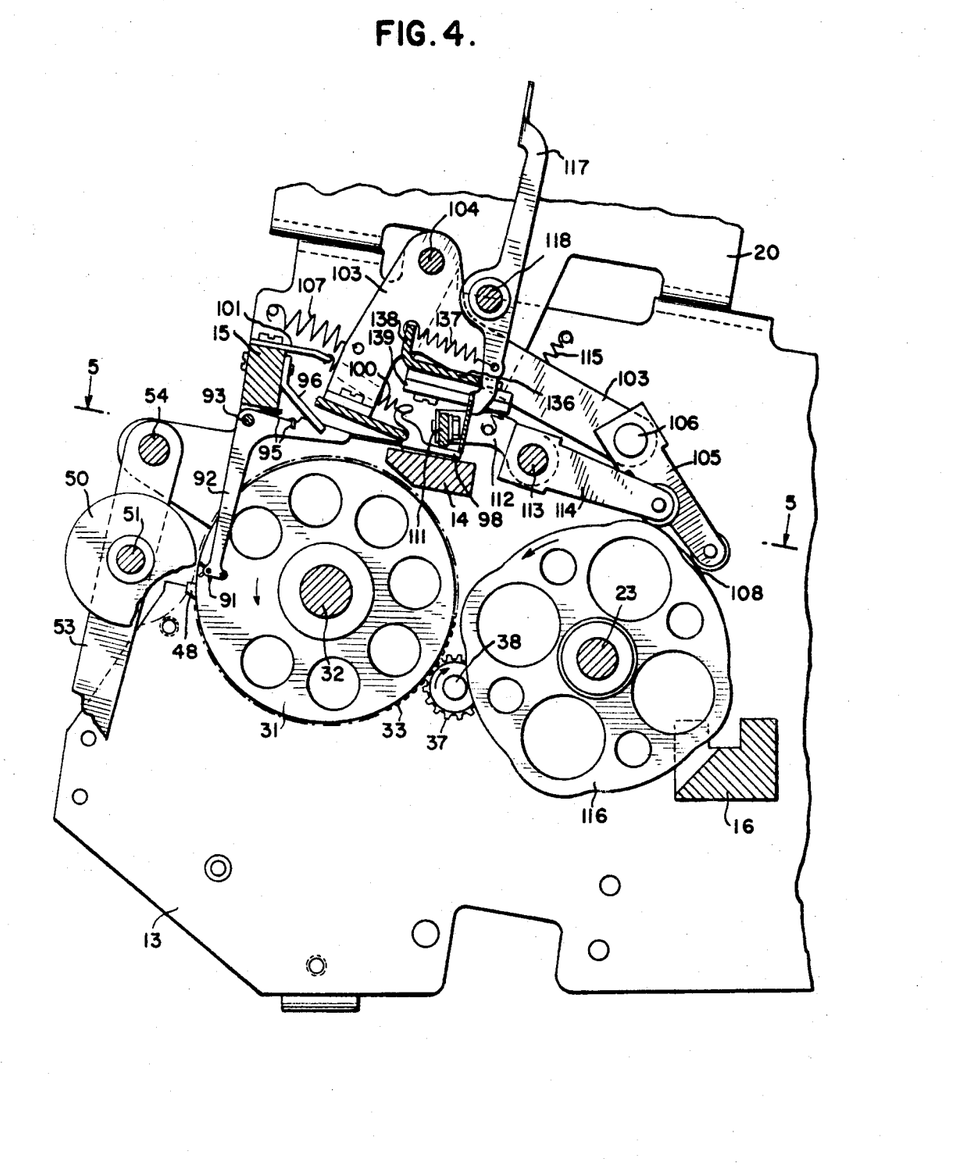
Figure 8:
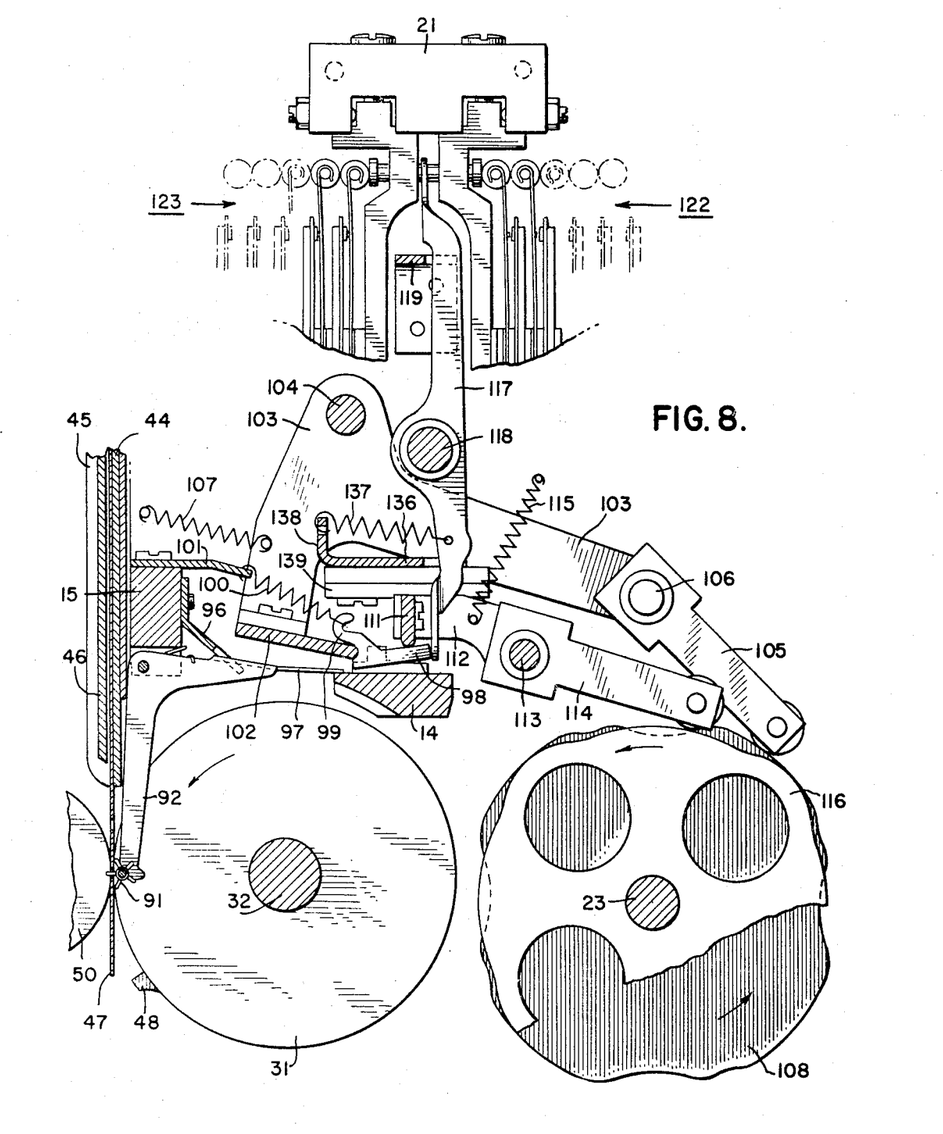
FIG. 8 is a cross-sectional view similar to FIG. 7 but illustrating an intermediate phase of operation of the reader.

The reader includes a plurality of tabulating-card code-aperture-sensing star wheels 91 rotatably supported as shown in FIGS. 4 and 6 at the ends of individual bell cranks 92, of U-shaped cross section, pivotally supported upon a shaft 93 positioned within a notch 94 (FIG. 3) of the spacing bar 15. The bell cranks 92 with their star wheels 91 are received between the flanges 31 of the main feed roll 30 as illustrated in FIG. 5. The star wheels of the several bell cranks 92 are aligned to sense concurrently each successive index-point column of the tabulating card transported through the reader, each of the star wheels sensing the code apertures in an individual index-point row of the card. Each of the bell cranks 92 is biased by a wire spring 95 toward code aperture sensing position wherein its associated star wheel 91 senses the presence and absence of code apertures in the tabulating card. Consider, for example, the "home" position of the main feed roll 30 illustrated in FIG. 6 where the projecting stop portions 48 engage and preposition the leading edge of the tabulating card 47 in readiness to begin a reading operation. The leading edge portion of the card has an unperforated area preceding the first index-point column of the card and, accordingly, two adjacent teeth of each star wheel 91 engage the surface of the card to maintain the bell cranks 92 rotated to a counter-clockwise position as seen in FIG. 6. Where, however, a code aperture is sensed in the card by the star wheel as illustrated in FIG. 8, a tooth of the star wheel projects through the code aperture and thus permits the associated bell crank 92 to rotate in a clockwise direction as seen in FIG. 8. These slight angular movements of the bell cranks 92 are guided by a comb 96 secured to the spacing bar 15.

The remote ends of the bell cranks 92 are provided with a flat latch portion 97. In the non-aperture sensing position of each bell crank 92, as illustrated in FIG. 6, the latch portion 97 is positioned to be engaged by an individual one of a plurality of pivotally supported reciprocal interposers 98 to restrict the range of reciprocal motion of the latter effected in a manner presently to be described. In the aperture sensing position of the bell crank 92, illustrated in FIG. 8, the latch portion 97 of the bell crank is positioned beneath its associated interposer 98 and thus does not limit the range of reciprocal motion of the interposer.

All of the interposers 98 are reciprocally guided by grooves formed in the upper surface portion of the spacing bar 14. Each interposer has an S-shaped end portion 99 biased by a helical wire spring 100, extending between the interposer portion 99 and a spring anchor plate 101 secured to the spacing bar 15, into engagement with a bail 102. The latter is supported at its ends by bell cranks 103 pivoted on individual studs 104 secured to the side plates 12 and 13 of the reader. The bail 102 and its supporting bell cranks 103 are reciprocated through a cycle of angular motion during each 90-degree rotation of the driven shaft 23 which, as previously explained, causes the main feed roll 30 to advance the tabulating card from one of its index-point columns to another.

Figure 9:
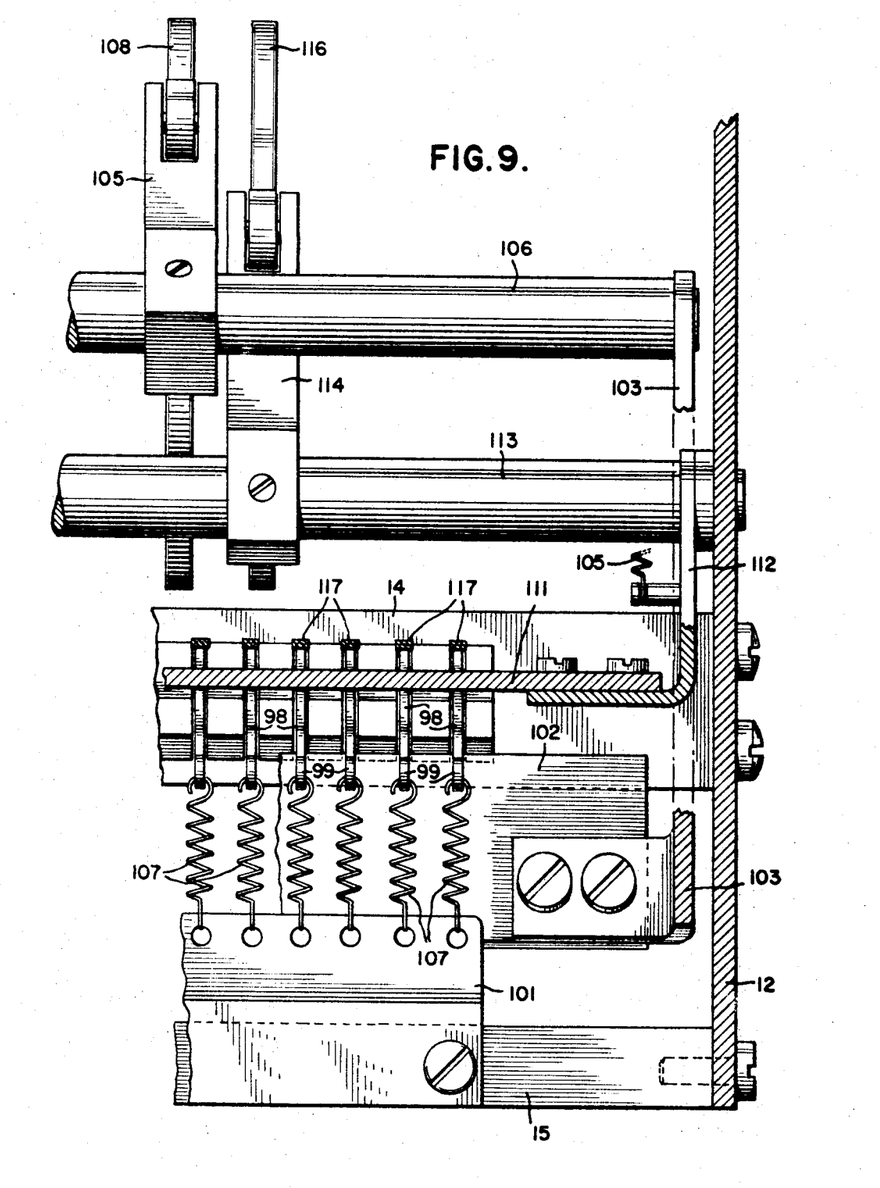
FIGS. 9 and 10 are fragmentary enlarged cross-sectional views illustrating certain details of construction of the readers.

This reciprocatory motion of the bail 102 and its supporting crank arms 103 is accomplished by a cam follower 105 which is fixed upon a shaft 106 (FIGS. 6 and 9) having its ends fixed to the bell crank arms 103, the cam-follower arm 105 being biased by a spring 107 into engagement with a cam 108 fixedly secured to the power driven shaft 23. As indicated in FIGS. 6 and 8, the cam 108 has four repetitive like lobe configurations spaced by 90 degrees corresponding to the four ninety-degree angular rotational step movements of the shaft 23 under control of the clutch 25. Each of these repetitive lobe configurations of the cam 108 includes a high step, an intermediate step and a low step. In each angular halt position of the shaft 23 as controlled by the clutch 25, the cam follower 105 rests upon the intermediate step of the cam 108 as illustrated in FIG. 6. This positions the bail 102 such that the interposers 98 have their ends spaced a short distance from the latch portion 97 of each of the star wheel bell cranks 92.

For this position of the bail 102, all of the interposers 98 are engaged by an unlatch bail 111 which is supported at its ends by arms 112 fixedly secured to a shaft 113 journalled in the side plates 12 and 13. A cam follower 114 (FIGS. 6 and 9) is secured to the shaft 113 and is biased by a spring 115 into engagement with a cam 116 secured on the power driven shaft 23 and having four raised lobes spaced ninety degrees around the periphery of the cam 116. Upon engagement of the unlatch bail 111 with the interposers 98 at a time when the cam follower 114 rests upon a lobe of the cam 116, the right hand ends of the interposers (as seen in FIGS. 6 and 8) are depressed by the bail below the lower ends of individual ones of a plurality of contact actuating levers 117 pivotally mounted on a shaft 118 supported between the side walls 19 and 20 of the upper subassembly 11 of the reader.

Figure 10:
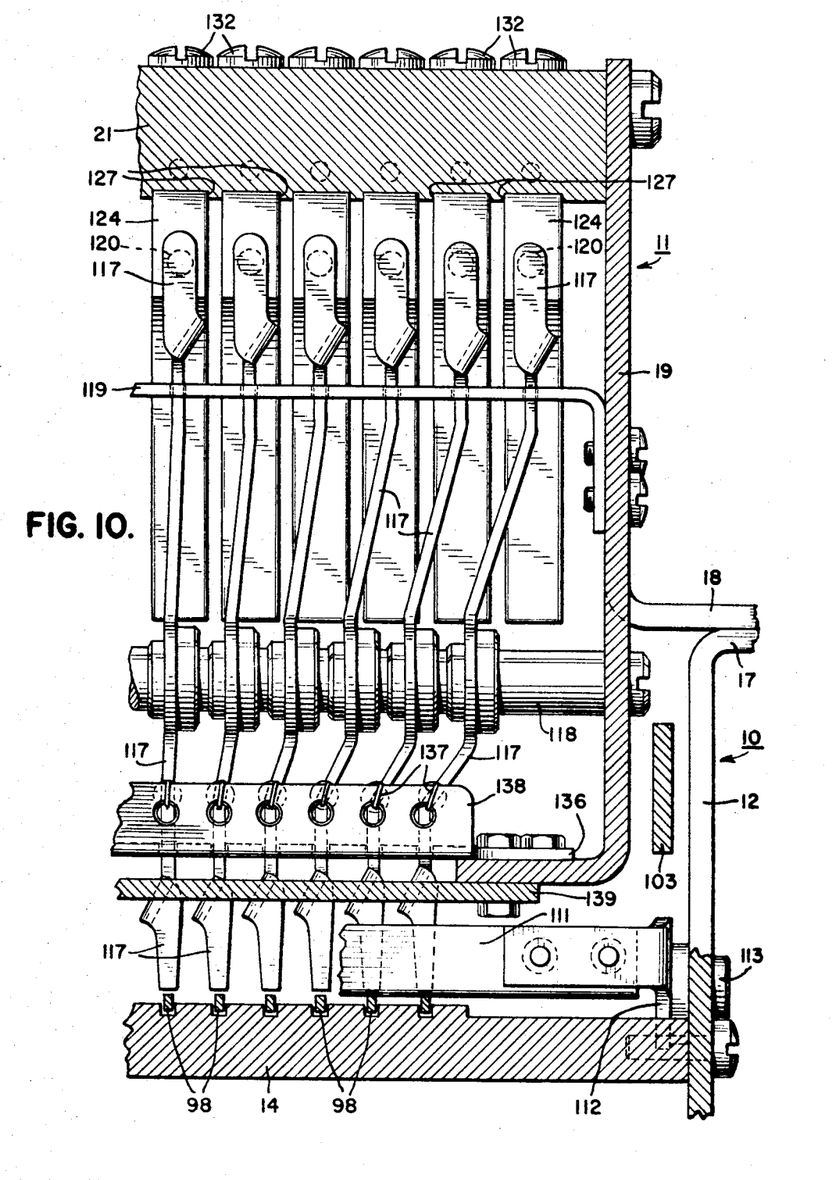

The contact actuating arms 117 may rotate through a small arc in a manner presently to be described, and are guided in this motion by a comb 119 supported between the side plates 19 and 20 of the subassembly 11. The upper end of each of the arms 117 engages oppositely disposed but axially aligned contact actuating pins 120 and 121 of two contact subassemblies 122 and 123, each having a base support member 124 upon which are mounted a stack of electrical contacts 125. Each of the base members 124 has an end foot portion 126 of rectangular cross-section which is received within and positioned by an individual one of plural transverse grooves 127 milled into the lower face of the spacing bar 21 of the upper subassembly 11. Each foot 126 of the base support members 124 has an integral extension 128 of square cross-section which is received within a longitudinal groove 129 of the spacing bar 21 and is positioned laterally within the groove by a set screw 130 having a lock nut 131 to lock the set screw in adjusted position. Each of the subassemblies 122 and 123 is secured in assembled relation with the spacing bar 21 by a machine screw 132 which extends through an elliptical aperture 133 of the spacing bar 21. As illustrated more clearly in FIGS. 1 and 6, the contact subassemblies 122 and 123 are positioned in sets in opposing relation transversely of the spacing bar 21 and there are plural sets of such subassemblies spaced longitudinally of the spacing bar 21. The total number of these sets corresponds to the number of star wheel bell cranks 92 with which the reader is provided to read a tabulating card having the same number of index-point rows. Since the index-point rows of the tabulating card are conventionally spaced more closely than it is conveniently feasible to space the relatively wider subassemblies 122 and 123 longitudinally of the spacing bar 21, the contact actuating levers 117 are offset from end to end as illustrated in FIG. 10. The amount of such offset varies with the relative position of a given one of the interposers 98 and the position of the corresponding contact subassembly set 122 and 123.

The contact actuating arms 117 are guided at their lower ends by a comb 136 (FIGS. 6 and 8) extending between and secured to the side plates 12 and 13 of the subassembly 10. The actuating arms 117 are biased by a spring 137, extending between each actuating arm and an upturned forward edge flange 138 provided on the comb 136, into engagement with the edge of a transverse stop bar 139 secured beneath the comb 136. With the actuating arms 117 in engagement with the stop bar 139, the lower ends of the actuating arms overlie in latching relation the right-hand ends (as seen in FIGS. 6 and 8) of the interposers 98 and thus prevent the latter from pivoting about the bail 102 under bias of the springs 100. Also in this position of the actuating arms 117, the electrical contacts of the contact subassembly 122 are in closed-contact position and the electrical contacts of the subassembly 123 are in open-contact position.

The operation of the tabulating card reader will now be considered with reference to the operation of one star wheel bell crank 92, its associated interposer 98, the associated contact actuating lever 117, and the set of contact subassemblies 122 and 123 actuated by the latter. It will, however, be understood that the described operation of these components apply in all respects to the operation of other similar components in the reader.

Assume at the outset that the reader stands ready to perform a tabulating card reading operation, and that a tabulating card 47 (FIG. 6) has been manually inserted into reading position in the card guide aperture formed by the elements 44–46. The lower or leading edge of the card 47 at this time engages the card stop portions 48 provided on spaced ones of the discs 31 of the main feed roll 30. The tabulating card 47 may be manually inserted into this position since the previous card reading operation terminated with the pressure roll discs 50 spaced from the discs 31 of the main feed roll 30 by reason of the fact that the pressure roll 49 was latched in spaced position by latched engagement to its supporting arms 52 and 53 with the latch arms 60. The area of the tabulating card 47 between its leading edge and its first index-point column is conventionally non-perforated as previously explained so that two adjacent teeth of the star wheel 91 engage the rear surface of the card and position the bell cranks 92 with their latch portions 97 raised into latching relation to their associated interposers 98. This is also the position of the components last mentioned when, during the card reading operation, a star wheel senses the absence of a code aperture in the card.

The card reading operation of the reader is preceded by energization of the pressure-roll latch-release electromagnets 65, which thereupon attract the armature 64 to rotate the latch bail arms 60 against the bias of their springs 62, and unlatch the pressure roll support arms 52 and 53. The latter, under bias of the springs 68, move the pressure roll 49 to engage its discs 50 with the front surface of the card and thereby press the latter into engagement with the discs 31 of the main feed roll 30. This movement of the support arms 52 and 53 actuates the electrical contacts 74 to closed-contact position to signify engagement of the pressure roll with the tabulating card.

The reader operation is now initiated by energization of the electromagnet (not shown) of the clutch 25 mechanically to couple the power drive pulley 29 to the driven shaft 23. Assuming that the energization of the clutch electromagnet is of brief duration, the driven shaft 23 rotates ninety angular degrees where it halts by reason of the fact that the clutch 25 interrupts the mechanical connection between the shaft and the drive pulley 29.

This angular movement of the shaft 23 is accompanied by corresponding angular movements of the cams 108 and 116. It was previously pointed out that this angular movement is initiated with the cam follower 105 resting upon the intermediate step of the cam 108 as illustrated in FIG. 6, so that counter-clockwise rotation of the cam 108 (as indicated by the directional arrow) acts to bring the lowest step of the cam 108 beneath the cam follower 105. This produces clockwise rotation of the bell cranks 103 and bail 102. The interposer 98 follows this motion of the bail 102, under bias of the interposer spring 100, until the end of the interposer engages the now-raised latch portion 97 of the star wheel bell crank 92 (the star wheel 91 at this time senses the absence of a code aperture in the tabulating card 47). Upon engagement of the interposer 98 with the latch portion 97, the forward movement of the interposer is halted and this occurs before its right-hand end (as seen in FIG. 6) can move out from beneath the end of the associated contact actuator 117. The bail 102 continues to move forwardly, and in doing so moves out of engagement with the interposer 98, until the cam follower 105 rests upon the lowest step of the cam 108. As the cam 108 continues its counter-clockwise rotation, its highest step lobe is brought under the cam follower 105 to rotate the bell cranks 103 and bail 107 in counter-clockwise direction. The bail 102, previously withdrawn from contact with the portion 99 of the interposer 98, eventually returns into engagement with the interposer and moves the interposer to the right (as seen in FIG. 6) so that the right-hand end of the interposer is moved further beneath the end of the contact actuator lever 117. Additional rotation of the cam 108 retains the bail 102 in counter-clockwise rotated position until near the end of the 90-degree angular rotation of the driven shaft 23, at which time the intermediate step of the cam 108 moves beneath the cam follower 105 to produce a small angular clockwise rotation of the crank arms 103 and bail 102. This partially withdraws the interposer 98 from beneath the end of the contact actuator lever 117. As this occurs, the cam 116 moves one of its lobes beneath the cam follower 114 to rotate the arms 112 and unlatch bail 111 counter-clockwise into engagement with the interposers 98. Such engagement serves no function under the prevailing operational conditions here considered. The 90-degree angular rotation of the shaft 23 ends with the cam follower 105 resting on the intermediate step of the cam 108 and with the cam follower 114 centered upon a lobe of the cam 116.

Figure 11:
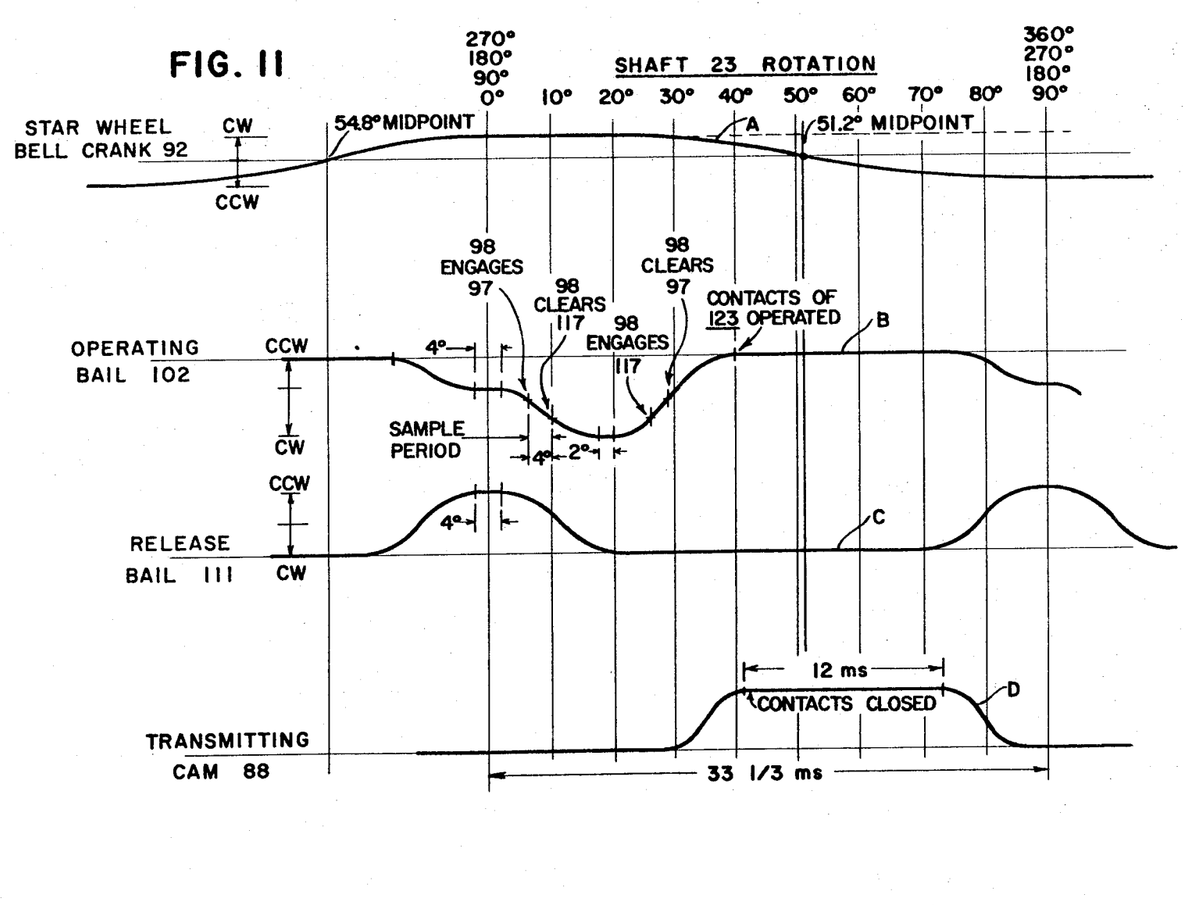
FIG. 11 graphically illustrates certain controlled motions of reader components and is used as an aid in explaining the operation of the reader.

While all of the foregoing interposer drive actuations are taking place, the angular movement of the shaft 23 rotates the drive roll 30 through the interconnecting gearing 34, 35 and 33, 37. Specifically, this first 90-degree angular rotation of the shaft 23 causes the drive roll 30 to rotate through a small angle sufficient to advance the card to a position where its first index-point column is sensed for code apertures by the star wheels 91. Assume that a star wheel 91 senses a code aperture upon advance of the card. The rotational motion of the drive roll 30 terminates with a tooth of the star wheel 91 projecting through the code aperture as illustrated in FIG. 8. This causes the star wheel bell crank 92 to rotate clockwise bringing its latch portion 97 below the associated interposer 98. The latch portion 97 is in this position, as represented by curve A of FIG. 11, at a controllable-halt position of the shaft 23 when the electromagnet (not shown) of the clutch 25 can once more be briefly energized mechanically to couple the shaft 23 to the drive pulley 29 for a further 90-degree angular rotation of the shaft. Assume that the clutch electromagnet is so energized. Now as the cam 108 begins to rotate in counter-clockwise direction, the cam follower 105 remains on the intermediate step of the cam for the first two degrees of cam rotation as represented by curve B of FIG. 11, and thereafter begins to drop onto the lower step of the cam. As it does so, the bail 102 moves clockwise as earlier explained and is followed in this motion by the interposer 98. Had the latch portion 97 of the bell crank 92 been in elevated position as in the operating condition first described, the end of the interposer 98 would have engaged the latch portion 97 after six degrees of rotation of the cam 108 as indicated on curve B. Under the condition here assumed, however, the latch portion 97 is in the lowered position and accordingly the interposer 98 moves over the latch portion 97 as the interposer continues to follow the rotational motion of the bail 102.

At ten degrees of rotation of the cam 108, the right-hand end of the interposer 98 moves from beneath the end of its associated contact actuator lever 117 as indicated on curve B. In the meantime, rotation of the cam 116 causes its lobe to move out from beneath the cam follower 114 to rotate the arms 112 and latch bail 111 away from the interposers as represented by curve C of FIG. 11. Thus when the right-hand end of the interposer 98 moves out from beneath the end of the actuating lever 117, the interposer is free to pivot about its engagement with the bail 102 under bias of the spring 100. This pivotal motion of the interposer 98 is terminated when the interposer engages the unlatch bail 111. The bail 102 continues its clockwise rotation to 19 degrees of rotation of the cam 108, at which time the unlatch bail 111 has been rotated to its maximum clockwise position, and thereafter the highest step of the cam 108 begins to move beneath the cam follower 105 to initiate counter-clockwise rotation of the crank arms 103 and bail 102.

At approximately 26 degrees of the angular rotation of the cam 108, the interposer 98 in pivoted position is moved by the bail 102 into engagement with the end of the contact actuator lever 117. Further counter-clockwise rotation of the bail 102 moves the interposer 98 to the right as seen in FIG. 8 and drives the contact actuator lever 117 counter-clockwise through its engagement with the interposer 98. The contact actuator lever 117 opens the contacts of the contact subassembly 122 and closes those of the subassembly 123 between 40 degrees and 75 degrees of rotation of the cam 108.

At 29 degrees of rotation of the cam 108, the left-hand end of the interposer 98 clears the end of the latch portion 97 of the star wheel bell crank 92 as indicated on curve B. Previous to this time, the driven shaft 23 had begun the rotation of the drive roll 30 to advance the tabulating card to its next index-point column. The interposer 98, having thus cleared the end of the latch portion 97, permits the star wheel bell crank 92 to rotate counter-clockwise should its star wheel 91 sense an absence of a code aperture in the next index-point column of the card. Curve A of FIG. 11 assumes that upon further advance of the tabulating card the star wheel senses the absence of a code aperture in the next index-point column of the card, and the resulting counter-clockwise rotation of the star wheel bell crank 92 arrives at the mid-range of its motion at approximately 51 degrees of rotation of the driven shaft 23 and has completed its movement upon completion of the 90-degree angular rotation of the shaft 23. Had the star wheel found a code aperture in the next index-point column of the card, the star wheel bell crank would have remained in its full clockwise rotated position as indicated by the horizontal broken line portion of curve A.

At 70 degrees of rotation of the shaft 23, the cam 106 begins to move a lobe beneath the cam follower 114 and depress the unlatch bail 111. The latter ultimately depresses all of the interposers 98 beneath the ends of their associated contact actuating arms 117 to allow the actuating arms 117 to return under bias of their springs 137 into engagement with the stop bar 139. This again closes the contacts of the contact subassembly 122 and opens the contacts of the contact subassembly 123. At 75 degrees of rotation of the cam 108, the cam follower 105 begins to drop onto the intermediate step of this cam and reaches the step at approximately 88 degrees of the cam rotation as represented by curve B. The cam follower arm 114 reaches the peak of a lobe of the cam 116 also at approximately 88 degrees of cam rotation, as indicated by curve C.

During the 90-degree angular rotation of the shaft 23 last considered, one of the cams 81 (FIG. 3) has actuated a corresponding set of contacts 88 to closed-contact position at approximately 41 degrees of angular rotation of the cam, as represented by curve D, and the contacts are maintained closed until approximately 74 degrees of cam rotation. It is through these contacts that the contacts of the contact subassemblies 122 and 123 are energized to derive the output coded electrical signals representative of the coded information read from each index-point column of the tabulating card. To this end, it will be noted from curve D that the contacts of the contact assembly 88 close after positioning of the contacts of the subassemblies 122 and 123 and open just before repositioning of the contacts of the latter.

The foregoing description of the reader operation assumes that the electromagnet (not shown) of the clutch 25 is energized for a brief interval each time it is desired to read the next index-point column of the tabulating card. It will be evident, however, that a continuing succession of index-point columns may be read by maintaining the clutch electromagnet continuously energized until an index-point column of the card is reached at which it is desired that the reader operation temporarily halt.

The standard tabulating card records a maximum of eighty alpha-numeric characters, symbols, or functional control items of information by use of eighty index-point columns of the card. After reading the last index-point column of the card, the next several 90-degree angular rotations of the driven shaft 23 engage the segmental gears 57 and 58 on the main feed roll 30 with the one-tooth segmental gears 59 provided on the pressure roll 49 and cause these engaged gear elements to move the pressure roll 49 to a position where its support arms 52 and 53 are latched by the latch arms 60. Upon separation of the pressure roll 49 from the main feed roll 30, the tabulating card drops under gravity out of the reader into a card hopper, not shown. The next several 90-degree rotations of the driven shaft 23 move the main feed roll 30 to its "home" position where the feeler shaft 78 (FIG. 3) enters the notch 77 of the cam 76 to bring the tabulating card reading operation to a halt.

The tabulating card reading mechanism of the present reader is disclosed and claimed in the Edwin O. Blodgett application, Ser. No. 249,228, filed Jan. 3, 1963, now Patent No. 3,304,410, entitled Tabulating Card Reader, and assigned to the same assignee as the present application.

It will be apparent from the foregoing description of the invention that a tabulating card reader embodying the invention provides very positive and accurately controlled card transport index column by index column past code aperture sensing devices. The reader may be readily used by an operator having little or no skill or training even though tabulating cards are manually inserted into the reader, the initial prepositioning of the card being readily attained without conscious effort on the part of the operator and it being impossible to remove the card once the reader has been conditioned to initiate a reading operation and until such time as the reading operation is completed. Thus reading error cannot be created by an unskilled operator alternating the reading position of the card in the reader once the reader is conditioned for reading operation nor can error be created by the act of the operator prematurely removing the card from the reader. There is the further advantage that a tabulating card reader embodying the invention retains high and reliably consistent card-feed positionings as it moves through the reader even though the card transport is by repetitive step motion involving relatively rapid acceleration and halt of each step movement of the card.

While a specific form of invention has been described for purposes of illustration, it is contemplated that numerous changes may be made without departing from the spirit of the invention.

I claim:

1. A tabulating card reader comprising reading means for reading successive items of coded information recorded in a tabulating card, a power driven feed roll adapted to engage and drivingly transport a tabulating card past said reading means by accurately controlled step motion, to read successive items of coded information thereof, a pressure roll and means for retaining said pressure roll out of pressure engagement with said card, positioning means for positioning the leading edge of the card between said feed roll and pressure roll in readiness to begin reading of the first recorded item of information thereof, means controllable to release said pressure roll into engagement with the card after said positioning thereof by said positioning means to effect driving engagement of the card with said feed roll and effect card feed to read said successive items of coded information thereof, means for actuating said last-mentioned means to release said pressure roll and initiate a card transport operation, and means responsive to a preselected extent of each card transport movement, corresponding substantially to the physical spacing between the first and last of said items of coded information thereof, for automatically moving said pressure roll out of pressure engagement with the card to release the card from reading position and terminate said card transport operation.

2. A tabulating card reader comprising reading means for reading successive items of coded information recorded in a tabulating card, a power driven feed roll adapted to engage and drivingly transport a tabulating card past said reading means by accurately controlled step motion to read successive items of coded information thereof, a power driven pressure roll, means for retaining said pressure roll out of pressure engagement with said card, positioning means for positioning the leading edge of the card between said feed roll and pressure roll in readiness to begin reading of the first recorded item of information thereof, means controllable to release said pressure roll into engagement with the card after said positioning thereof by said positioning means to effect driving engagement of the card with both of said rolls and effect card feed to read said successive items of coded information thereof, means for actuating said last-mentioned means to release said pressure roll and initiate a card transport operation, and means responsive to a preselected extent of each card transport movement for automatically moving said pressure roll out of pressure engagement with the card to release the card from reading position and terminate said card transport operation.

3. A tabulating card reader comprising reading means for reading successive items of coded information recorded in a tabulating card, a feed roll adapted to engage and drivingly transport a tabulating card past said reading means by accurately controlled step motion during each revolution of the feed roll from a home position at which each card reading operation begins, to read successive items of coded information thereof, a pressure roll, movable stop means adapted at said home positions of said feed roll to engage and pre-position the leading edge of each card between said feed roll and said pressure roll in readiness for a transport operation but effectively to withdraw from card restraint upon initiation of a transport operation, means for retaining said pressure roll out of pressure engagement with said card and means controllable to release said pressure roll into engagement with said card after said pre-positioning of the leading edge of each card to effect driving engagement of the card with said feed roll and effect card feed to read said successive items of coded information thereof means for actuating said retaining means to release said pressure roll in readiness to initiate a card transport operation, means for rotatably driving said feed roll to effect card transport past said reading means, and means responsive to a preselected angular rotation of said feed roll from said home position thereof corresponding substantially to the physical spacing between the first and last of said items of coded information on the card, for automatically moving said pressure roll out of pressure engagement with the card to release the card from reading position and terminate each card transport operation.

4. A tabulating card reader comprising reading means for reading successive items of coded information recorded in a tabulating card, a feed roll adapted to engage and drivingly transport a tabulating card past said reading means by accurately controlled step motion to read successive items of coded information thereof during each revolution of the feed roll from a home position at which each card reading operation begins, means included on said feed roll at the home position thereof for engaging and pre-positioning the leading edge of each card in readiness for a card transport operation, a pressure roll and means for retaining said pressure roll out of pressure engagement with said card but controllable to release said pressure roll into engagement with the card after said pre-positioning of the leading edge of each card to effect driving engagement of the card with said feed roll and effect card feed to read said successive items of coded information, means for actuating said retaining means to release said pressure roll in preparation for a card transport operation, means for rotatably driving said feed roll to effect card transport past said reading means, and means responsive to a preselected extent of each card transport movement, corresponding substantially to the physical spacing between the first and last of said items of coded information thereof, for automatically moving said pressure roll out of pressure engagement with the card to release the card from reading position and terminate said card transport operation.

5. A tabulating card reader comprising reading means for reading successive items of coded information recorded in a tabulating card, a power driven feed roll adapted to engage and drivingly transport a tabulating card past said reading means by accurately controlled step motion to read successive items of coded information thereof, a pressure roll having continuously geared coupling to said feed roll for power drive therefrom, means for retaining said pressure roll out of pressure engagement with said card, positioning means for positioning the leading edge of the card between said feed roll and pressure roll in readiness to begin reading of the first recorded item of information, means controllable to release said pressure roll into engagement with the card after said positioning thereof by said positioning means to effect driving engagement of the card with both of said rolls and effect card feed to read said successive items of coded information, thereof, means for actuating said retaining means to release said pressure roll and initiate a card transport operation, and means responsive to a preselected extent of each card transport movement corresponding substantially to the physical spacing between the first and last of said items of coded information thereof, for automatically moving said pressure roll out of pressure engagement with the card to release the card from reading position and terminate said card transport operation.

6. A tabulating card reader comprising reading means for reading successive items of coded information recorded in a tabulating card, a power driven feed roll adapted to engage and drivingly transport a tabulating card past said reading means by accurately controlled step motion to read successive items of coded information thereof, a pressure roll supported for movement between a first position out of pressure engagement with said card and a second position engaging and pressing said card into positive driving engagement with said feed roll, positioning means for positioning the leading edge of the card between said feed roll and pressure roll in readiness to begin reading of the first recorded item of information thereof, latch means for retaining said pressure roll in said first position but including means for actuating said latch means to release said pressure roll to said second position, after said positioning of the card by said positioning means, in readiness to initiate a card transport operation, and effect card feed to read said successive items of coded information thereof, and means responsive to a preselected extent of card transport movement corresponding substantially to the physical spacing between the first and last of said items of coded information thereof, for automatically moving said pressure roll to said first position to release the card from reading position and terminate said card transport operation.

7. A tabulating card reader comprising reading means for reading successive items of coded information recorded in a tabulating card, a power driven feed roll adapted to engage and drivingly transport a tabulating card past said reading means by accurately controlled step motion to read successive items of coded information thereof, a pressure roll rotatably supported by arms pivoted for movement between a first position at which said pressure roll is out of pressure engagement with said card and a second position at which said pressure roll engages and presses said card into positive driving engagement with said feed roll, positioning means for positioning the leading edge of the card between said feed roll and pressure roll in readiness to begin reading of the first recorded item of information thereof, latch means for actuating said latch arms in said first position, means for actuating said latch means to release said pressure roll to card engaged position after said positioning thereof, by said positioning means, in readiness to initiate a card transport operation and effect card feed to read said successive items of coded information thereof, and means responsive to a preselected extent of card transport movement, corresponding substantially to the physical between the first and last of said items of coded information thereof, for automatically moving said pressure-roll support arms to said first position thereof for latched retention by said latch means to release the card from reading position and terminate said card transport operation.

8. A tabulating card reader comprising reading means for reading successive items of coded information recorded in a tabulating card, a feed roll adapted to engage and drivingly transport a tabulating card past said reading means by accurately controlled step motion to read successive items of coded information thereof, a pressure roll rotatably supported by arms pivoted for movement between a first position at which said pressure roll is out of pressure engagement with said card and a second position at which said pressure roll engages and presses said card into positive driving engagement with said feed roll positioning means for positioning the leading edge of the card between said feed roll and pressure roll in readiness to begin reading of the first recorded item of information thereof, latch means for latching said arms in said first position, means for actuating said latch means to release said pressure roll to card engaged position after said positioning thereof, by said positioning means in readiness to initiate a card transport operation and effect card feed to read said successive items of coded information thereof, means for driving said feed and pressure rolls at a preselected integral value of relative angular velocities, and means operative at least once during each complete revolution of one of said rolls for moving said pressure-roll support arms to said first position thereof for latched retention by said latch means to release the card from reading position and terminate said card transport operation.

9. A tabulating card reader comprising reading means for reading successive items of coded information recorded in a tabulating card, a power driven feed roll adapted to engage and drivingly transporting a tabulating card past said reading means by accurately controlled step motion to read successive items of coded information thereof, a pressure roll continuously mechanically coupled to said feed roll for power drive therefrom, means for retaining said pressure roll out of pressure engagement with said card, positioning means for positioning the leading edge of the card between said feed roll and pressure roll in readiness to begin reading of the first recorded item of information thereof, means controllable to release said pressure roll into engagement with the card after said positioning thereof, by said positioning means to effect driving engagement of the card with said feed roll and effect card feed to read said successive items of coded information thereof, means for actuating said retaining means to release said pressure roll and initiate a card transport operation, and means on said feed and pressure rolls cooperatively responsive to a preselected extent of each card transport movement corresponding substantially to the physical spacing between the first and last of said items of coded information thereof, for automatically moving said pressure roll out of pressure engagement with the card to release the card from reading position and terminate said card transport operation.

10. A tabulating card reader comprising reading means for reading successive items of coded information recorded in a tabulating card, a power driven shaft, a feed roll mechanically rotationally coupled to said shaft and adapted to engage and drivingly transport a tabulating card past said reading means by accurately controlled step motion to read successive items of coded information thereof, a pressure roll mechanically rotationally coupled to said feed roll and rotatably supported by arms pivoted for movement between a first position at which said pressure roll is out of pressure engagement with said card and a second position at which said pressure roll engages and presses said card into positive driving engagement with said feed roll positioning means for positioning the leading edge of the card between said feed roll and pressure roll in readiness to begin reading of the first recorded item of information thereof, latch means for latching said arms in said first position, means for actuating said latch means to release said pressure roll to card engaged position after positioning of the card by said positioning means in readiness to initiate a card transport operation and effect card feed to read said successive items of coded information thereof, and means provided on said rolls and arranged for mechanical inter-engagement at least once during each complete revolution of one of said rolls for moving said pressure-roll support arms to said first position thereof for latch retention by said latch means to release the card from reading position and terminate said card transport operation.

11. A tabulating card reader comprising reading means for reading successive items of coded information recorded in a tabulating card, a power driven feed roll adapted to engage and drivingly transport a tabulating card past said reading means by accurately controlled step motion to read successive items of coded information thereof, a pressure roll continuously mechanically geared to said feed roll for power drive therefrom, positioning means for positioning the leading edge of the card between said feed roll and pressure roll in readiness to begin reading of the first recorded item of information thereof, latch means having a latch position for retaining said pressure roll out of pressure engagement with said card but controllable to unlatch position to release said pressure roll into engagement with the card after said positioning thereof, by said positioning means, to effect driving engagement of the card with said feed roll and effect card feed to read said successive items of coded information thereof, means for actuating said latch means to said unlatch position thereof to release said pressure roll in readiness to initiate a card transport operation, and supplemental inter-drive gearing carried by said feed and pressure rolls and operative upon a preselected extent of each card transport movement, corresponding substantially to the physical spacing between the first and last of said items of coded information thereof, for automatically moving said pressure roll to latch position engagement by said latch means, whereby said pressure roll is out of pressure engagement with the card to release the card from reading position and terminate said card transport operation.

12. A tabulating card reader comprising reading means for reading successive items of coded information recorded in a tabulating card, a power driven feed roll adapted to engage and drivingly transport a tabulating card past said reading means by accurately controlled step motion to read successive items of coded information thereof, during each revolution of said feed roll from a home position at which each card reading operation begins, a pressure roll rotatably supported by arms pivoted for movement between a first position at which said pressure roll is out of pressure engagement with said card and a second position at which said pressure roll engages and presses said card into positive driving engagement with said feed roll positioning means for positioning the leading edge of the card between said feed roll and pressure roll in readiness to begin reading of the first recorded item of information thereof, latch means for latching said arms in said first position, means for actuating said latch means to release said pressure roll to card engaged position positioning thereof, by said positioning means, in readiness to initiate a card transport operation and effect card feed to read said successive items of coded information thereof, and supplemental inter-drive gearing carried by said feed and idler rolls and operative just preceding each rotation of said feed roll to said home position thereof for moving said pressure-roll support arms to said first position thereof for latched retention by said latch means to release the card from reading position and terminate said transport operation.

13. A tabulating card reader comprising reading means for reading successive items of coded information recorded in a tabulating card, a power driven shaft, a feed roll mechanically rotationally coupled to said shaft and adapted to engage and drivingly transport a tabulating card past said reading means by accurately controlled step motion to read successive items of coded information thereof, a pressure roll having continuous internal-ratio geared coupling to said feed roll and rotatably supported by arms pivoted for movement between a first position at which said pressure roll is out of pressure engagement with said card and a second position at which said pressure roll engages and presses said card into positive driving engagement with said feed roll positioning means for positioning the leading edge of the card between said feed roll and pressure roll in readiness to begin reading of the first recorded item of information thereof, latch means for latching said arms in said first position, means for actuating said latch means to release said pressure roll to card engaged position after said positioning of the card by said positioning means in readiness to initiate a card transport operation and effect card feed to read said successive items of coded information thereof, and segmental gears carried by said feed rolls and arranged for mechanical inter-engagement once each complete revolution of said feed rolls for moving said pressure-roll support arms to said first position thereof for latched retention by said latched means to release the card from reading position and terminate said card transport operation.

References Cited
UNITED STATES PATENTS

| | | | |
|---|---|---|---|
| 2,508,603 | 5/1950 | Gollwitzer | 235—61.11 |
| 2,605,699 | 8/1952 | Gollwitzer | 101—93 |
| 2,860,758 | 11/1958 | Rhodes | 197—133 |
| 3,296,605 | 1/1967 | Raddin et al. | 235—61.11 X |

MAYNARD R. WILBUR, *Primary Examiner.*

R. COUNCIL, T. J. SLOYAN, *Assistant Examiners.*